United States Patent [19]

Kruger et al.

[11] Patent Number: 5,063,080

[45] Date of Patent: Nov. 5, 1991

[54] SUGAR-FREE CRUST CHOCOLATES

[75] Inventors: Christof Kruger, Hamburg; Karl Cappelmann, Solingen-Wald, both of Fed. Rep. of Germany

[73] Assignee: Suomen Xyrofin Oy, Kotka, Finland

[21] Appl. No.: 524,879

[22] Filed: May 18, 1990

[30] Foreign Application Priority Data

May 18, 1989 [DE] Fed. Rep. of Germany ....... 3916189
Dec. 2, 1989 [DE] Fed. Rep. of Germany ....... 3939997

[51] Int. Cl.$^5$ ............................................. A23G 1/00
[52] U.S. Cl. ..................................... 426/660; 426/658; 426/575; 426/804; 426/103
[58] Field of Search ............... 426/103, 660, 575, 804, 426/658

[56] References Cited

U.S. PATENT DOCUMENTS

| | | | |
|---|---|---|---|
| 2,461,399 | 2/1949 | Strausser | 426/103 |
| 3,958,024 | 5/1976 | Fissolo | 426/103 |
| 3,961,089 | 6/1976 | Dogliotti | 426/103 |
| 4,105,801 | 8/1978 | Dogliotti | 426/103 |
| 4,154,867 | 5/1979 | Aldrich et al. | 426/660 |
| 4,260,596 | 4/1981 | Mackles | 426/103 |
| 4,292,337 | 9/1981 | Andersen | 426/660 |
| 4,323,588 | 4/1982 | Vink | 426/660 |
| 4,430,351 | 2/1984 | Cillario | 426/660 |
| 4,466,983 | 8/1984 | Cifrese et al. | 426/660 |
| 4,623,543 | 11/1986 | Motegi et al. | 426/103 |

*Primary Examiner*—Jeanette Hunter
*Attorney, Agent, or Firm*—Wegner, Cantor, Mueller & Player

[57] ABSTRACT

The present invention relates to a composition for preparing sugar-free crust chocolates which composition comprises a polyol, water or a water-alcohol mixture, and a gelatinizing agent or thickening agent, respectively.

16 Claims, No Drawings

SUGAR-FREE CRUST CHOCOLATES

DESCRIPTION OF THE INVENTION

The present invention relates to a composition for preparing sugar-free crust chocolates.

According to the prior art so far known, crust chocolates consist of saccharose, water or mixtures of water and alcohol including or excluding added flavouring agents and food acids. To prepare a representative recipe, 2500 g of water, 7500 g of saccharose and 2000 g of alcohol having a strength of 60% by volume are mixed. The resulting mixture is boiled at a boiling temperature of from 111° to 114° C., resulting in a dry substance content of from 82 to 86%.

After boiling (concentrating) sugar and water, the alcohol is immediately admixed with the hot sugar solution in order to prepare crust chocolates containing alcohol. A loss of alcohol is avoided by the use of specialized mixing systems. The dry substance content is reduced to 86 to 72%, depending on the degree of boiling and the amount added, by the addition of alcohol having a strength of 60% by volume. In addition, the maximum solubility of saccharose being 67% at a temperature of 20° C. in a pure aqueous solution is reduced to about 57% when dissolved in an aqueous alcoholic solution containing 10% by weight of alcohol. Hence, there remains a sufficient amount of saccharose for the generation of a crust.

The so-called acidic crust chocolates are commonly prepared from 7500 g of saccharose, 2500 g of water, 10 g of fruit flavour and 100 g of a food acid, e.g. citric acid monohydrate dissolved in a ratio of 1:1. In contrast to the preparation of crust chocolates containing alcohol, the degree of boiling is adjusted to a temperature of from 108° to 109° C., resulting in a dry substance content of from 78 to 79%. The flavouring agent and the food acid are admixed with the saccharose solution not before the solution is cooled down to 65° C. Such a low temperature is essential in order to avoid an excessive inversion of the saccharose resulting in a poor generation of a crust.

The solutions thus obtained are poured into a forming powder by means of a so-called mogul unit. The temperature of the starch is 35° to 55° C. for alcoholic crust chocolates. For acidic crust chocolates, the temperature is below 30° C. The residual moisture of the forming powder is 5 to 7% for both solutions poured. The maturing time amounts to 24 hours, and turning is carried out after 2 hours. After maturing, the products are removed from the powder and coated with molten chocolate.

In recent years, on account of the risks for the dental health and in order to offer persons suffering from diabetes a suitable and safe alternative, there were made more and more efforts to replace saccharose with sugar-substitute materials taking care of the teeth and being suitable for persons suffering from diabetes. In view of the crust chocolates, however, there was the problem that attempts to generate, by the use of sugar-substitute materials, a sufficiently mechanically stable crust not being destroyed in removing the chocolates from the powder and coating them had so far failed.

Hence, it was an object of the present invention to provide a composition for preparing sugar-free crust chocolates which composition provides a mechanically stable crust after the boiling step.

The above object is attained by said composition comprising polyols, water or a water-alcohol mixture, and thickening agents retarding a gelatinization or crystallization.

Basically, it is true that, in the preparation of crust chocolates comprising polyols, the ratios of mixing the components are different from mixtures containing saccharose.

In the preparation of crust chocolates containing saccharose, the ratio of sugar to water usually is 3:1. Such ratio is sufficient to obtain complete dissolution of the saccharose with boiling. In substituting saccharose with polyols, a ratio of two parts of polyol to one part of water must be adjusted. This is essential as a result of the differences in solubilities and boiling points different as compared to the case of saccharose. In the subsequent table, the dry substance contents for solutions containing saccharose, sorbitol, lactitol and xylitol (which are typically used as the polyol in accordance with the present invention) corresponding to certain boiling points are listed. It is stressed that other Polyols can also be used, e.g. mannitol, maltitol, isomalt. Additionally, the composition according to the present invention can comprise food acids and/or flavouring agents.

TABLE

| Temperature (boiling degree C.) | Dry Substance Content (%) for | | | |
|---|---|---|---|---|
| | Saccharose | Sorbitol | Lactitol | Xylitol |
| 106 | 74,1 | 63,3 | — | 60,2 |
| 107 | — | — | 73,9 | — |
| 108 | — | 70,0 | — | 65,5 |
| 109 | 78,8 | — | — | — |
| 110 | 78,6 | 74,4 | 80,0 | 70,5 |
| 111 | — | — | — | — |
| 112 | — | 78,0 | 82,0 | 74,6 |
| 113 | 85,2 | — | — | — |
| 114 | — | 80,5 | 85,1 | 77,9 |
| 115 | — | — | — | — |
| 116 | — | 82,4 | 86,2 | 80,5 |

It is recognizable from the above table that, at certain boiling temperatures, the dry substance content of solutions containing polyols is different from the respective value for saccharose. Furthermore, it is evident that higher boiling degrees are necessary in order to obtain the same dry substance contents using polyols than with the use of saccharose. For example, a boiling degree of 110° C. is necessary in order to obtain a dry substance content of 70,5% using xylitol. A solution of saccharose has a dry substance content of 78,6% at said boiling degree. In addition, polyols have different saturation concentrations in aqueous solutions, as reflects the subsequent table:

| Solubility of saccharose and polyols at a temperature of 20° C. (in % by weight) | |
|---|---|
| saccharose | 67 |
| sorbitol | 70 |
| xylitol | 63 |
| maltitol | 62 |
| lactitol | 55 |
| isomalt | 25 |

As shown by the subsequent figure, the maximum solubility of xylitol, however, is lower than the solubility of saccharose only below 30° C. Above said temperature xylitol is better soluble than saccharose.

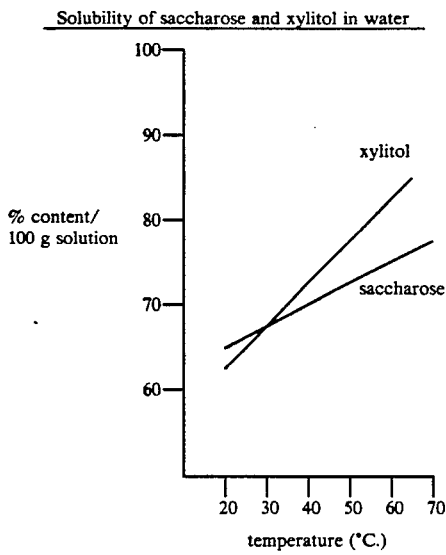

Solubility of saccharose and xylitol in water

As a result of a considerably higher heat of solution of the polyols as compared to saccharose, more heat is needed for dissolving them. This energy which is released as heat during crystallization must be carried off again after pouring the solution into a forming powder. The subsequent table shows the heats of solution of saccharose and polyols (in kJ/kg):

| | |
|---|---|
| saccharose | 18,16 |
| isomalt | 39,40 |
| lactitol | 53,20 |
| sorbitol | 110,99 |
| mannitol | 120,88 |
| xylitol | 153,07 |

Dependent on the temperature of the forming powder the crystallization of e.g. xylitol for the generation of a crust takes up to 6 hours. During this time nothing at all happens, i.e. the poured mass shows no inclination to generate crystals. During said 6 hours in which there exists no inclination of the solution to crystallize, the poured mass is pasted up with the starch at the contact points.

In order to avoid that, gelatinizing agents or viscosity enhancing substances (thickening agents) must be added. Suitable substances for said purpose are e.g. pectins, gum arabic and agar-agar. A further reason for adding pectin and gum arabic to the poured mass is that after the above mentioned 6 hours xylitol spontaneously crystallizes, and the solution precipitates oversized crystals which fact results in an unstable crust or in a pulpy crust chocolate body. The relatively high content of gum arabic retards the process of crystallization. Only small-size crystals are developed which form a stable crust. Thus, the above substances are necessary for a controlled crystallization. The high content of gum arabic in addition shows that the retardation of the crystallization must be very intense.

Gelatinizing agents other than gum arabic as the thickening agent show different effects. In using agar-agar in an amount of more than 0,3%, a hybrid product is formed, i.e. the product has no liquid phase but is provided with a soft crust. In this case, the liquid phase is slightly gelled.

A further substance producing similarly favourable results is a syrup of maltitol.

Without the addition of an agent retarding the crystallization not only coarse crystals and a pulp are formed but also the heat of crystallization is carried off in an uncontrolled manner. Thereby holes or lugs are formed at the crust.

It appears that the forming powder is an excellent insulator against heat which does not carry off rapidly enough the heat energy generated during crystallization. Thus, with an insufficient removal of the heat either lugs or holes are generated in the completed crust. It is remarkable that the lugs and holes, respectively, directed inwards are always formed within the center of the powder mould.

By employing a ventilator during the maturing time, it can be achieved that said phenomena disappear. Using the composition according to the invention allows to dispense with the use of a ventilator. However, it is crucial to observe certain ratios of the amounts. At a content of pectin powder of more than 0.2, the liquid phase begins to become gelled so as to have the consistence of a jam. Likewise, it is necessary to observe the ratio of polyol to water. For the above reason, 42 to 71% by weight of polyol, 28 to 48% by weight of water or a water-alcohol mixture, 10 to 1% by weight of a gelatinizing agent and a thickening agent are preferably mixed according to the invention. The ratio of polyol to water is preferably 2.5:1 to 1.5:1, and more preferably, 2:1. The alcohol preferably has a strength of 40 to 70% by volume, and more preferably, 60% by volume.

The invention is further explained in detail by the subsequent examples.

EXAMPLE 1

Preparation of crust chocolates containing alcohol

A composition was prepared consisting of 2100 g of xylitol, 1050 g of water, 400 g of alcohol having a strength of 60% by volume, 60 g of gum arabic (spray dried) and 6 g of the pectin POMOSIN 1000 S.

Crystalline xylitol was mixed in a dry state with gum arabic and pectin. Said step is necessary in order to avoid clotting. Gum arabic as well as pectin tend to cause clotting when admixed to water and, hence, are poorly dissolved.

The dry composition was admixed to water, and the solution was boiled at a temperature of 114° C. to prepare crust chocolates containing alcohol. A dry substance content of 78% was the result. After boiling, the alcohol was at once added to the xylitol solution without loss, and the solution thus obtained was immediately poured into the forming powder. The temperature of the starch was about 35° C., and the residual moisture content of the starch was about 5 to 7%. By adding alcohol a solubility value for xylitol of about 58% could be obtained.

EXAMPLE 2

Preparing acidic crust chocolates

For preparing acidic crust chocolates containing xylitol, a method similar to that of example 1 was carried out, except for the boiling degree being adjusted to 109° C. Therefrom, a dry substance content of 68% resulted. In contrast to the preparation of chocolates having a crust of saccharose wherein the food acid is permitted to be admixed only at a temperature of 65° C. because of the risk of a too high inversion, xylitol may be admixed immediately in the presence of the food acid since an inversion cannot occur. Following the addition of the acid, the dry substance content is only slightly reduced.

The above boiled solutions were poured into the forming powder. In the same way as for the alcoholic crust chocolates, the temperature of the forming powder was about 35° C., and the residual moisture content of the starch was about 5 to 7%.

In contrast to the preparation of chocolates using saccharose, the time until turning of the chocolates could be carried out was in both examples 6 hours and not 2 hours. The maturing time of the xylitol crust, i.e. the time until a complete crust was formed, was about 24 hours.

Schematic representation and characteristic numbers of the crust chocolates prepared according to the Examples 1 and 2
2100 g 1050 g
xylitol water
2 parts:1 part

| Acidic crust chocolates | | Alcoholic crust chocolates |
|---|---|---|
| | 1. Preparation of the dry mixture | |
| | 2. Boiling in water | |
| 109° C. | | 114° C. |
| | Dry substance content according to the boiling degree: | |
| 68% | | 78% |
| | 3. Mixing | |
| 20 g acid | | 400–450 g alcohol |
| (in solution 1:1) | | having a strength |
| 3 g fruit flavour | | of 60 Vol. % |
| | 4. Dry substance content after addition without cooling the mass | |
| 67,5% | | 71% |
| | 5. Pouring into the forming powder | |
| 35° C. | temperature of the forming powder | 35° C. |
| 5–7% | residual moisture content of the forming powder | 5–7% |
| 5 h | time until turning | 6 h |
| 24 h | maturing time | 24 h |
| 62% | dry substance content after maturing | 57,5% |

We claim:

1. A composition for preparing a sugar-free crust for candies consisting essentially of:
   (a) a polyol at 42–71% by weight;
   (b) water or a mixture of water and alcohol at 28 to 48% by weight; and
   (c) a thickening agent for retarding gelatinization or crystallization at 1–10% by weight;
   wherein the ratio of said polyol to said water is 2.5:1 to 1.5:1.

2. The composition according to claim 1, wherein the ratio of said polyol to said water is 2:1.

3. The composition according to claim 1, wherein said polyol is selected from the group consisting of xylitol, sorbitol, mannitol, maltitol, lactitol, isomalt and combinations thereof.

4. The composition according to claim 1, wherein said alcohol has a strength of 40 to 70% by volume.

5. The composition according to claim 1, wherein said thickening agent includes gum arabic.

6. The composition according to claim 1, wherein said thickening agent includes a syrup of maltitol.

7. The composition according to claim 1, wherein said thickening agent includes agar-agar.

8. The composition according to claim 1, further comprising food acids or flavoring agents.

9. A method for preparing a sugar-free crust for candies from a composition consisting essentially of a polyol at 42–71% by weight, water or a mixture of water and alcohol at 28 to 48% by weight, and a thickening agent for retarding gelatinization or crystallization, said method comprising:
   (a) mixing said polyol in a dry state with said thickening agent;
   (b) admixing the mixture obtained in (a) with said water such that a ratio of said polyol to said water is 2.5:1 to 1.5:1;
   (c) boiling the mixture obtained in (b); and
   (d) crystallizing the mixture obtained in (c) to obtain a sugar-free crust.

10. The method according to claim 9, wherein the ratio of said polyol to said water is 2:1.

11. The method according to claim 9, wherein said polyol is selected from the group consisting of xylitol, sorbitol, mannitol, maltitol, lactitol, isomalt and combinations thereof.

12. The method according to claim 9, wherein said alcohol has a strength of 40 to 70% by volume.

13. The method according to claim 9, wherein said thickening agent includes gum arabic.

14. The method according to claim 9, wherein said thickening agent includes a syrup of maltitol.

15. The method according to claim 9, wherein said thickening agent includes agar-agar.

16. The method according to claim 9, further comprising food acids or flavoring agents.

* * * * *